United States Patent
Shin

(10) Patent No.: US 10,099,673 B2
(45) Date of Patent: Oct. 16, 2018

(54) VEHICLE BRAKE MANAGEMENT DEVICE

(71) Applicant: Hyun-Oh Shin, Namyangju-si (KR)

(72) Inventor: Hyun-Oh Shin, Namyangju-si (KR)

( * ) Notice: Subject to any disclaimer, the term of this patent is extended or adjusted under 35 U.S.C. 154(b) by 29 days.

(21) Appl. No.: 15/301,329

(22) PCT Filed: Mar. 11, 2015

(86) PCT No.: PCT/KR2015/002330
§ 371 (c)(1),
(2) Date: Sep. 30, 2016

(87) PCT Pub. No.: WO2015/152529
PCT Pub. Date: Oct. 8, 2015

(65) Prior Publication Data
US 2017/0120886 A1   May 4, 2017

(30) Foreign Application Priority Data

Apr. 1, 2014  (KR) .......................... 10-2014-0038541

(51) Int. Cl.
| | | |
|---|---|---|
| *G01M 17/00* | (2006.01) | |
| *G06F 7/00* | (2006.01) | |
| *G06F 19/00* | (2018.01) | |
| *B60T 17/22* | (2006.01) | |
| *B60T 7/12* | (2006.01) | |
| *B60T 17/18* | (2006.01) | |
| *B60T 8/88* | (2006.01) | |

(52) U.S. Cl.
CPC .............. *B60T 17/221* (2013.01); *B60T 7/12* (2013.01); *B60T 8/885* (2013.01); *B60T 17/18* (2013.01); *B60T 2270/413* (2013.01)

(58) Field of Classification Search
CPC ........... B60T 8/885; B60K 1/02; B60K 6/365; B60K 6/547; B60L 2240/441; B60W 20/00
USPC ....................................................... 701/33.7
See application file for complete search history.

(56) References Cited

U.S. PATENT DOCUMENTS

| | | |
|---|---|---|
| 5,954,406 A | 9/1999 | Sawada |
| 6,119,059 A | 9/2000 | Tai et al. |
| 6,312,061 B1 | 11/2001 | Schliebe et al. |
| 6,679,355 B2 | 1/2004 | Suzuki |

(Continued)

FOREIGN PATENT DOCUMENTS

| | | |
|---|---|---|
| CN | 103167977 A | 6/2013 |
| DE | 10-2011-081240 A1 | 4/2012 |

(Continued)

*Primary Examiner* — Maceeh Anwari
(74) *Attorney, Agent, or Firm* — Maschoff Brennan

(57) ABSTRACT

A vehicle brake management device is disclosed. The vehicle brake management device of the present invention: detects, in real time, whether the brake performance of a vehicle in motion is abnormal such that a driver or a mechanic can easily check the abnormality, thereby identifying causes thereof according to a brake failure, and can repair or replace abnormal parts; displays an alert when a brake system malfunctions, particularly when in motion, so as to enable the driver to check the malfunction; and prevents starting so as to disable operations when an engine restarts after the operation has finished, thereby remarkably reducing the risk for the occurrence of an accident and increasing vehicle reliability to consumers.

2 Claims, 2 Drawing Sheets

(56) References Cited

U.S. PATENT DOCUMENTS

| | | |
|---|---|---|
| 8,994,523 B2 | 3/2015 | Wallace et al. |
| 9,145,121 B2 | 9/2015 | Jungbecker et al. |
| 2009/0112434 A1 | 4/2009 | Park |
| 2013/0297179 A1 | 11/2013 | Gruber et al. |

FOREIGN PATENT DOCUMENTS

| | | | |
|---|---|---|---|
| JP | 2002-213508 A | | 7/2002 |
| JP | 2010-112444 A | * | 5/2010 |
| JP | 2010-112444 A | | 5/2010 |
| KR | 10-1998-0044622 A | | 9/1998 |
| KR | 10-19980044633 A | * | 9/1998 |
| KR | 10-0348040 B1 | | 8/2002 |
| KR | 10-0405569 B1 | | 11/2003 |
| KR | 10-2010-0086963 A | | 8/2010 |
| KR | 10-20100086963 A | * | 8/2010 |
| KR | 10-2012-0113427 A | | 10/2012 |
| KR | 10-20120113427 A | * | 10/2012 |

* cited by examiner

VEHICLE BRAKE MANAGEMENT DEVICE

TECHNICAL FIELD

The present invention relates to a vehicle brake management device which is able to judge in real time any abnormality in a brake system of a vehicle, and in particular to a vehicle brake management device which makes it possible to check out a predetermined state in such a way to monitor in real time any abnormality in the components of a brake system, and to previously prevent any accident possibility which might occur due to a defect in terms of a brake performance during the driving of a vehicle in such a way to induce an alarm and an exchange of a corresponding component if an abnormal component is found.

BACKGROUND

The brake pedal which is used to decelerate or stop the speed of a vehicle during the driving of the vehicle, in general, is formed of a brake pedal configured to be pedaled by a vehicle driver, a booster which is a boosting component configured to receive and multiple an operational pedal effort of the brake pedal, a master cylinder configured to create a hydraulic pressure in such a way to pressurize oil through the booster, and a wheel brake equipped with a wheel cylinder configured to regulate a disk drum of a wheel with the aid of the master cylinder.

The brake pedal is configured to operate based on the principle of a lever. The brake pedal is installed about an action point. If a driver works a pedal, the force applied from a fixing point to a push rod may allow to push the piston of a master cylinder through a booster, thus creating a hydraulic pressure, and this hydraulic pressure may be constantly transferred to the cylinder of each wheel brake, by which a braking force can be operated.

The booster is referred to a device which is able to multiple the pressure of a driver transferred from a brake pedal to a master cylinder, namely, a boosting component which is able to increase a brake operational force. A vehicle which weighs heavy like a large size truck, in general, is equipped with a vacuum compressor, wherein an indirect operation of a hydro vac type in terms of the operation of a booster is employed. In case of a common passenger vehicle, a direct operation of a maser vac type is employed, wherein the booster is driven using the vacuum created from an intake manifold of an engine.

The master cylinder is referred to a component which is able to convert a pedal effort corresponding to the pedaling force of a brake pedal into a hydraulic pressure, wherein a brake liquid and a piston are disposed inside of the master cylinder, and the created hydraulic pressure is transferred to a wheel cylinder through a brake pipe, and the piston inside of the wheel cylinder is pushed backward by the hydraulic pressure, thus pushing a brake shoe or a brake pad toward a drum or a disk, by which a braking force can be created. This master cylinder may be categorized into a tandem type wherein two master cylinders are disposed in series to resolve a problem wherein a brake doesn't work if a defect occurs, for example, the leakage of a brake liquid in a hydraulic pressure system and to enhance a safety; a stepped tandem type wherein the pistons of different diameters are employed, and if one circuit is broken, the pressure of a normal circular increases, thus supplementing the lack of a braking force; a central valve type (a tandem master cylinder with a central valve) wherein this is employed at a vehicle equipped with an ABS (Anti-lock Brake System), and a central valve installed at the piston carries out the function of a compensation port; and a residual pressure check valve (a residual check valve) wherein this can be employed in case where a cup seal is used at a wheel cylinder of a drum brake, and this can be assembled to a brake pipe or a master cylinder and a brake pipe or can be installed inside of the master cylinder.

For the sake of a deceleration and stop during the driving of a vehicle, the vehicle is equipped with a wheel brake which is able to brake front wheels and rear wheels, a booster which is a boosting component to transfer an operational pressure to the wheel brake by forming a braking hydraulic pressure, and a master cylinder. If a vehicle driver works a brake pedal, a braking force may be created as a small force is transferred to a wheel brake which includes a booster configured to boost (multiple) a small force which has been applied to a brake pedal, a master cylinder which is a hydraulic pressure component configured to convert a large force into a hydraulic pressure and constantly transfer a pressure (a hydraulic pressure) irrespective of the distance to a braking device, a hydraulic cylinder having a large area for the transferred hydraulic pressure to have a large force, and a brake pad having a good friction force.

Meanwhile, since the braking performance of the vehicle is directly associated with safety, a manufacturer is carrying out an inspection with respect to the components which form a braking system.

As an example of a conventional braking performance inspection technology, the Korean patent registration number 10-0405569 discloses "a braking performance evaluation and test device". According to Claim 1 thereof, the braking performance evaluation and test device is formed of a wheel speed sensor configured to detect if a vehicle is being driven; a brake pedal sensor configured to detect if a brake pedal is being operated; a pressure sensor configured to detect a braking pressure supplied via a brake pipe when a braking force is created by a vehicle which is being driven, an electronic controller wherein a target braking pressure set based on a condition and kind of a braking performance evaluation and test is inputted, and a target time which is necessary to reach the target braking pressure is inputted, and a braking pressure maintaining time to constantly maintain the target braking pressure until the braking is completed, is inputted; an assistant braking hydraulic generation unit which is installed connected to the brake pipe and is configured to be selectively driven in response to a control of the electronic controller and to create an assistant braking hydraulic pressure; a first pressure control value configured to control an open route with the aid of a control of the electronic controller in order for a braking hydraulic pressure created by the operation of the brake pedal and an assistant braking hydraulic pressure created by the driving of the assistant braking hydraulic pressure generation unit to be selectively supplied toward a brake main body based on the braking performance evaluation and test step; and a plurality of second pressure control valves which are installed at the brake pipe connected to the brake main body of the front wheel and at the brake pipe connected to the brake main body of the rear wheel and are configured to be selectively opened or closed in response to a control of the electronic controller based on the braking performance evaluation and test step.

The aforementioned conventional technology braking performance evaluation and test device has a problem in the way that a vehicle having a good braking performance can be developed in such a way to obtain a braking performance data calculation and collection at the vehicle development stage; however it is impossible to check any abnormality in various components which form the braking system. More specifically, the conventional braking performance evaluation and test device cannot be used for the purpose of confirming a braking performance state of a vehicle after it has been installed at a common commercial vehicle.

Moreover, as another conventional technology, the Korean patent registration number 10-0348040 discloses "a performance test device for a brake booster". According to Claim 1, the performance test device for a brake booster is formed of a shelf member; an engaging unit formed of an arm member engaging bracket hinged with an arm member fixed rotatable at the other side to move after it has been hinged to a driving rod of a braking booster at one side, wherein the engaging unit allows to install the arm member and the booster on the shelf member at a predetermined distance between them; a vacuum unit configured to convert the inside of the booster into a negative pressure state; and a confirmation unit configured to check a braking state of a wheel based on the operation of the booster.

The thusly configured performance test device of a brake booster is configured to check out the performance of the brake booster before it is installed at a vehicle, thus preventing the use of a defective product; however it is impossible to judge if the brake booster has any performance problem after it has been installed at a vehicle which is currently in operation.

Since most of the conventional braking performance test devices of a vehicle are used for the purpose of evaluating the performance of each component forming a braking system at the stage of a vehicle manufacturing or for the purpose of judging any defective problem before a corresponding component is installed at a vehicle, so it is impossible to check out any abnormality in terms of a braking performance with respect to the newly released vehicles. For this reason, it urgently needs to develop a new device which is able to resolve the aforementioned problems. More specifically, the performance of a vehicle may be degraded or the vehicle may be damaged as each component forming the vehicle is aged due to the driving of the vehicle. The information on, for example, an engine revolution, an engine temperature, the amount of fuel, a battery state, the temperature of a cooling water, a speed meter, etc. which are related with the driving performance of the vehicle are provided in real time to a vehicle driver; however the information related with the braking performance for the sake of stop and deceleration is not provided. For this reason, if any problem occurs in the braking system during the driving of the vehicle, a serious problem may occur. Moreover, in case of a safety inspection which is regularly carried out with respect to all the vehicles, only the defects on the lighting state of a braking light and the amount of a brake oil are checked out. The inspection with respect to the braking performance is not carried out.

In the conventional technology, since the vehicles are driven without specifically checking out any abnormality in the braking system, a driver's safety may not be not secured, thus causing a serious problem.

The braking force of a vehicle when it is first released, is good; however, as time passes, the braking force may be gradually degraded. Since the driving force of the engine is regularly checked out from the release of a vehicle to the end of its service life, the performance of the engine can be maintained constant. More specifically, the driving performance of the vehicle can be maintained through a regular vehicle inspection and management; however, the braking performance of the vehicle is not appropriately managed since there is not any inspection criteria, for which an appropriate measurement thereon is urgently necessary.

SUMMARY OF THE INVENTION

Accordingly, the present invention is made in an effort to resolve the conventional technology problems. The present invention provides a vehicle brake management device which is able to previously prevent any danger and accident due to a defect in terms of a braking performance in such a way to check out in real time any abnormality in a braking system with respect to a vehicle which currently is in operation after it has been released.

In addition, the present invention provides a vehicle brake management device which is able to prevent any accident occurrence danger by forcibly stopping the operation of a vehicle when restarting the engine if a braking performance is less than a predetermined level and enhance the reliability with respect to the braking performance of the vehicle.

A method for estimating a vehicle brake management device according to an exemplary embodiment of the present disclosure may include a brake pedal configured to receive a driver's pedal effort, a booster which is a boosting component which is able to multiple the pedal effort in cooperation with the pedal effort of the brake pedal, a master cylinder connected to the booster and configured to create an operational pressure by pressurizing the oil, and a wheel cylinder connected to the master cylinder and configured to regulate a disk drum having a disk pad of a wheel, thus managing the braking of a vehicle, there is provided a vehicle brake management device according to a preferred embodiment of the present invention which may include a pedal effort sensor installed at one side of the brake pedal and configured to detect the pedal effort; a vacuum sensor configured to detect a vacuum pressure inside of the booster; a pressure sensor configured to detect the pressure of the master cylinder; a pad sensor configured to measure an abrasion level of the disk pad; and a controller connected to the pedal effort sensor, the vacuum sensor, the pressure sensor and the pad sensor and configured to receive a detection value thereof and determine any abnormality by comparing the detection value with a previously inputted reference setting value and output a result thereof in the form of a control signal.

As a preferred feature of the present invention, the controller is configured to guide in real time, to the vehicle driver, at least one or two or more than two information among a processing result value, a pedal effort sensor detection value, a vacuum sensor detection value, a pressure sensor detection value, and a pad sensor detection value and is connected to a display unit which is formed of any or both of a display which is able to display information on a screen and a speaker which is able to output the information in the form of sound.

According to another preferred feature of the present invention, the controller includes a connector which is a connection component which is able to supply, to an external measurement device, at least one or two or more than two of a processing result value, a pedal effort sensor detection value, a vacuum sensor detection value, a pressure sensor detection value, and a pad sensor detection value.

According to further another feature of the present invention, the controller includes one or more than one of an input unit configured to receive a detection value from each of the pedal effort sensor, the vacuum sensor, the pressure sensor and the pad sensor; a calculation unit configured to compare the detection value inputted via the input unit with a previously inputted reference setting value and process the values; an output unit configured to output the information processed by the calculation unit; and a memory unit which is connected to the input unit, the calculation unit and the output unit and is configured to receive information from each of them and store the received information.

According to may further another feature of the present invention, the controller includes an engine start controller which is able to control that the engine of the vehicle is not started selectively based on the processing result value.

The vehicle brake management device according to the present invention is able to prevent any accident danger in such a way to judge the cause due to a braking defect and carry out a repair or exchange of a defective component after any abnormality in a braking performance with respect to a vehicle which is currently in operation has been detected in real time, thus allowing a vehicle driver or a repair man to easily check it out.

Moreover, the present invention is able to provide advantages in the way that if any abnormality occurs in the braking system when in operation, a predetermined alarm is generated for a vehicle driver to check out the abnormality, and if the engine is restarted after the operation has been ended, the engine start is interrupted to make the operation of the vehicle unavailable, so any accident danger can be greatly reduced, and a customer's reliability with respect to the vehicle can be enhanced.

The present disclosure may be understood more readily by reference to the following detailed description of the accompanying drawings. The terms or words used throughout the specification and claims should not be interpreted as having typical or dictionary-based meanings, but should be interpreted as having the meaning and concepts which match with the technical ideas of the present invention based on the principle wherein an inventor is able to appropriately define the concepts of the terms so as to describe his invention in the best way.

Figure 1:
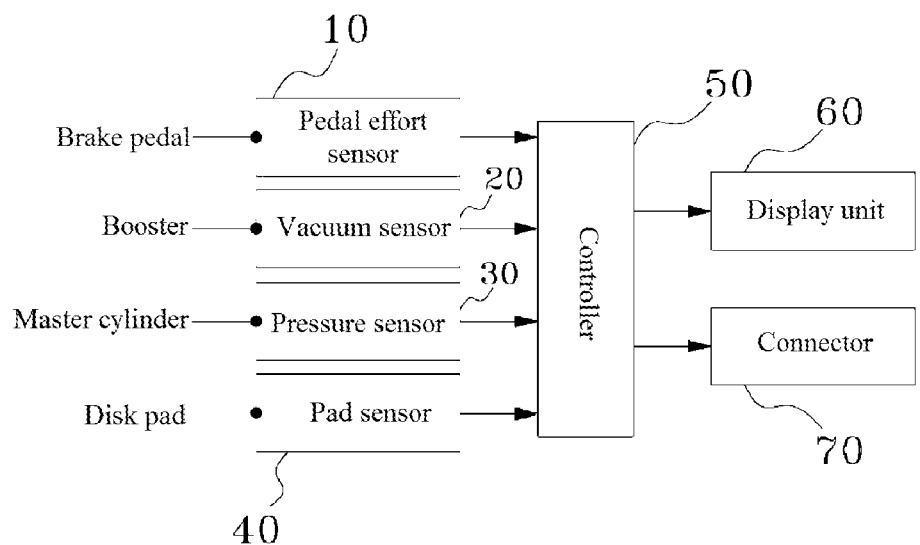
FIG. 1 is a view schematically illustrating a configuration of a vehicle brake management device according to the present invention.

<Legend of reference numbers on key components in the drawings>

| | |
|---|---|
| 3: | Brake pedal |
| 5: | Booster |
| 7: | Master cylinder |
| 9: | Brake pad |
| 10: | Pedal effort sensor |
| 20: | Vacuum sensor |
| 30: | Pressure sensor |
| 40: | Pad sensor |
| 50: | controller |
| 51: | Input unit |
| 52: | Calculation unit |
| 53: | Output unit |
| 54: | Memory unit |
| 60: | Display unit |

DETAILED DESCRIPTION OF THE EMBODIMENTS

The vehicle brake management device according to the present invention will be described with reference to the accompanying drawings. It is noted that the same components or parts in the drawings are given the same reference numbers. In the course of the descriptions of the present invention, the detailed descriptions on the related function or configuration will be omitted to avoid making the subject matters of the present invention ambiguous.

FIG. 1 is a view schematically illustrating the entire configuration of a vehicle brake management device according to the present invention. FIG. 1 shows a brake pedal 3 which forms a braking system of a vehicle, a booster 5 which multiples a pedal effort in cooperation with the brake pedal 3, a master cylinder 7 which is connected to the booster 5 and creates an operational pressure by pressurizing oil, and a disk pad 9 of a wheel cylinder which is connected to the master cylinder 7 and friction-contacts with a wheel by means of an operational pressure. The vehicle brake management device may include a pedal effort sensor 10 configured to detect in real time the state of each component forming the braking system, a vacuum sensor 20, a pressure sensor 30, a pad sensor 40, a controller 50 which is configured to receive the signals detected by the above-listed components and compares with a reference setting value and outputs a control signal via its output terminal, and a display unit 60 which is connected to the output terminal of the controller 50 and receives a control signal and displays a result value of the processing or a connector 70 which is an output port which can be connected to an external device.

Figure 2:
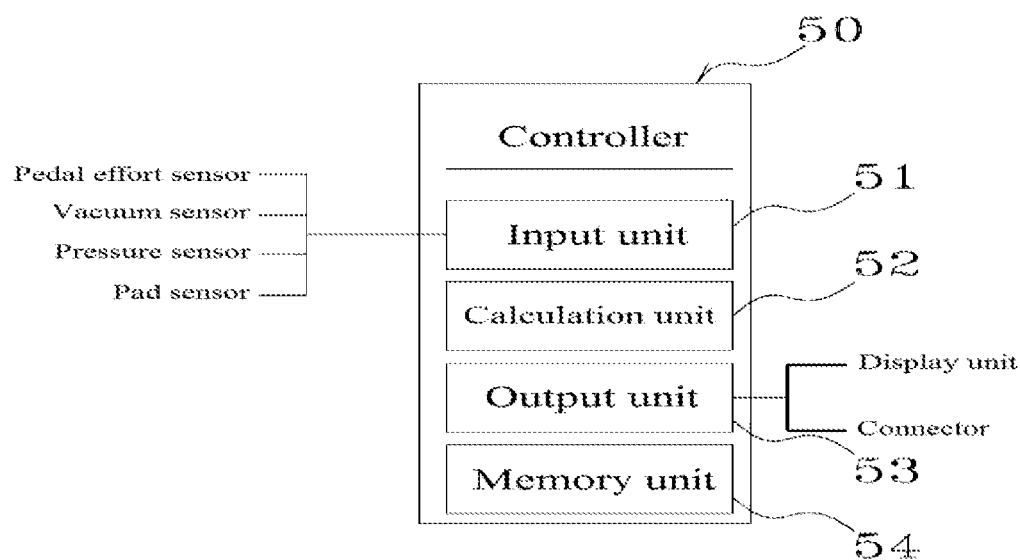
FIG. 2 is a block diagram for describing a configuration of a vehicle brake management device according to the present invention.

FIG. 2 is a block diagram for describing a configuration of a vehicle brake management device according to the present invention. Referring to FIG. 2, the vehicle brake management device may include a sensor unit which is formed of a pedal effort sensor 10 configured to detect a pedal effort signal of the brake pedal 3, a vacuum sensor 20 configured to detect a vacuum pressure of the booster 5, a pressure sensor 30 configured to detect an operational pressure of the master cylinder 7, and a pad sensor 40 configured to detect the abrasion of the disk pad 9; a controller 50 which is configured to receive the signals detected by the sensor unit and process the controls thereof, a display unit 60 which is connected to the output terminal of the controller 50 and is configured to display in real time the output values, and a connector 70 which is a connection port for the sake of a connection with an external measurement device.

Figure 3:
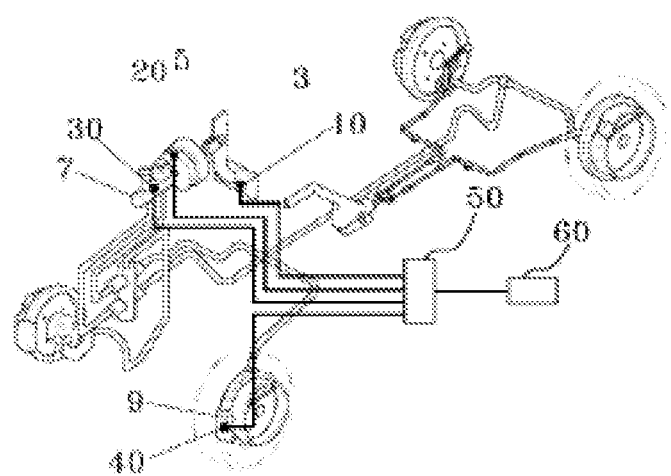
FIG. 3 is a block diagram for describing a configuration of a controller according to the present invention.

FIG. 3 is a block diagram for describing a configuration of a controller according to the present invention. Referring to FIG. 3, the controller 50 may include an input unit 50 configured to receive the information detected by the pedal effort sensor 10, the vacuum sensor 20, the pressure sensor 30 and the pad sensor 40, a calculation unit 52 configured to compare the detection value inputted from the input unit 51 with a previously inputted reference setting value, an output unit 53 configured to output to the outside the information processed by the calculation unit 52, and a memory unit 54 configured to store the information from the input unit 51, the calculation unit 52 and the output unit 53.

The configuration of the vehicle brake management device according to the present invention will be described with reference to the accompanying drawings.

In the present invention, any abnormality is detected in real time in the brake pedal 3, the booster 5, the master cylinder 7 and the disk pad 9 which form the braking system of the vehicle, and the detected value is compared with a reference setting value, thus providing a vehicle driver with the information on the braking performance. As key components, the present invention may include the pedal effort sensor 10 configured to detect the pedal effort of the brake pedal 3, the vacuum sensor 20 configured to detect the vacuum level of the booster 5, the pressure sensor 30 configured to detect the pressure value of the master cylinder 7, the pad sensor 40 configured to detect the abrasion level of the disk pad 9, the controller 50 configured to receive the values detected by the above-listed sensor components and process the values, the display unit 60 configured to receive the result information processed by the controller 50 and report to the vehicle driver, and the connector 70 configured to output the result information after it has been connected to an external measurement device.

The pedal effort sensor 10 is a detection component which is installed at one side of the brake pedal 3 and is configured to detect a pedal effort. The pedal effort sensor 10 is able to detect an operational force when a vehicle driver pedals the brake pedal 3 and transmit the detected operational force to the controller 50 connected to the output terminal. The pedal effort sensor 10 is referred to a component which is able to detect the force when the vehicle driver pedals the brake pedal, namely, the magnitude of the pedal effort. It is installed at one side of the brake pedal 3, thus detecting the pedal effort. Since this pedal effort sensor 10 can be implemented using a known technology, the detailed descriptions thereof will be omitted.

The vacuum sensor 20 is referred to a detection component which is able to detect the vacuum pressure in the booster 5. The vacuum sensor 20 is able to measure a negative pressure applied to the booster 5 which is a boosting component to boost or multiple the pedal effort as the vehicle driver pedals the brake pedal 3 and is able to transmit the measured detection value to the controller 50 connected to the output terminal thereof. This vacuum sensor 20 is installed inside of the booster 5 and is able to detect the negative pressure in the form of an electric signal. Various known vacuum sensors may be used for the aforementioned vacuum sensor as long as it is equipped with a feature to measure the vacuum pressure inside of the booster 5, so the detailed descriptions thereof will be omitted.

The pressure sensor 30 is a detection component which is installed inside of the master cylinder 7 or is installed at the side of the output terminal of the master cylinder 7, thus detecting the pressure. The detected measurement is supplied to the controller 50 connected to the output terminal. Since the pressure sensor 30 may be implemented using a known technology, the detailed descriptions thereof will be omitted.

The pad sensor 40 is a detection component which is able to measure the abrasion level of the disk pad 9. The pad sensor 40 may be installed at one side of the disk pad 9, thus detecting the abrasion level thereof and supplying the detected measurement value to the controller 50 electrically connected to the output terminal. This pad sensor 40 is called a brake pad abrasion sensor, and since it can be implemented using a known technology, the detailed descriptions thereof will be omitted.

The controller 50 is connected to the pedal effort sensor 10, the vacuum sensor 20, the pressure sensor 30 and the pad sensor 40 which are the detection components, and may be formed of a microcomputer employed as a control component which is able to receive each detection information, compare with a previously inputted reference setting value, judge any abnormality and output a result thereof in the form of a control signal. This controller 50 may include an input unit 51 which is electrically connected to the detection components and is configured to receive the detection value, a calculation unit 52 which is able to judge any abnormality by comparing the detection value inputted via the input unit 51 with a previously inputted reference setting value, an output unit 53 which is able to supply a result information processed by the calculation unit 52 to the display unit 60 or the connector 70, and a memory unit 54 which is electrically connected to the input unit 51, the calculation unit 52 and the output unit 53 and is able to receive and store the information.

Meanwhile, it is preferred that the controller 50 further includes an engine start controller which is able to control that the engine of the vehicle is not selectively started based on a processing result value. This start controller may be provided in a separate form. Alternatively, an ECU (Electronic Control Unit) may be used instead.

The display unit 60 is a component which is connected to the output unit 53 of the controller 50 and is able to receive the processed result information and is able to provide in real time to the vehicle driver. The information which is supplied to the vehicle driver may be a result information processed after it has been connected to the output unit 53 of the controller 50. More specifically, the aforementioned information may be any or two or more than two of a processing result value of the controller, a pedal effort sensor detection value, a vacuum sensor detection value, a pressure sensor detection value, and a pad sensor detection value. This display unit 60 may include a device which is formed of any or one or more than one of a display which is able to display a result information on the screen in order for the vehicle driver to visually and easily confirm the braking performance or a speaker which is able to output in the form of sound in order for the vehicle driver to recognize any abnormality in the braking performance in the form of sound. Preferably, a predetermined display is used, which is able to visually display information while providing a sound output.

The connector 70 is a connection port component which is connected to the output unit 53 of the controller 50 and is able to supply, to an external measurement device or a measurement device, a processed information, namely, at least one or two or more than two of a processed result value of the controller, a pedal effort sensor detection value, a vacuum sensor detection value, a pressure sensor detection value, and a pad sensor detection value. The connector 70 may be formed of any of various known connectors, but it is preferred that it is formed of an OBD (On-Board Diagnosis) connector which is basically provided at the vehicle.

The operation of the vehicle brake management device according to the present invention will be described.

If the start of the engine is turned on for the driving of a vehicle, the components start to operate, which are formed of the pedal effort sensor 10 installed at one side of the brake pedal 3 configured to receive the pedal effort from the vehicle driver based on the supply of electric power, the vacuum sensor 20 installed inside of the booster 5 creating a negative pressure in cooperation with the brake pedal 3 and configured to measure the negative pressure, the pressure sensor 30 connected to the booster 5 and installed inside of the master cylinder 7 which creates an operational pressure, thus measuring the pressure, and the pad sensor 40 installed at the disk pad 9 which has a friction against the wheel based on the operational pressure applied from the master cylinder 7, thus measuring an abrasion level, so each detection value is supplied to the controller 50.

The controller 50 has the inputted values, for example, a reference pedal effort value of the brake pedal 3, a reference negative value of the booster 5, a reference operational pressure value of the master cylinder 7, and a reference abrasion value of the disk pad 9, and is able to compare the previously inputted reference setting value with the detection values inputted from each detection component, thus judging any abnormality. More specifically, if the measurement value inputted from each sensor component is normal or within an allowable error range with respect to the previously inputted setting value, the controller 50 may determine that the braking system is normal, and if such values are out of the error or normal range, the controller may allow to display, on the display unit 60, a performance defect with respect to a corresponding braking component (a brake pedal or a booster or a master cylinder or a disk pad) in order for the vehicle driver to recognize such defects.

It is to be understood that invention is not limited to the disclosed embodiments, on the contrary, is intended to cover various modifications and transformations include within the sprit and scope of the appended claims. and therefore all modifications and transformations that fall within the meets and bounds of the claims, or equivalences of such meets and bounds are therefore intended to be embraced by the appended claims.

What is claimed is:

1. A vehicle brake management device, comprising:
at least one of a pedal effort sensor installed at one side of a brake pedal that receives a pedal effort of a vehicle driver and detects the pedal effort; a vacuum sensor that detects a vacuum pressure inside of a booster which is a boosting component that multiplies the pedal effort in cooperation with the pedal effort of the brake pedal; a pressure sensor connected to the booster that detects the pressure of a master cylinder which creates an operational pressure in such a way to pressurize oil; and a pad sensor that measures an abrasion level of the disk pad of a disk drum connected to the master cylinder and provided at a wheel, thus managing the braking of the vehicle, wherein a controller is further provided, which is connected to at least one or more of the pedal effort sensor, the vacuum sensor, the pressure sensor and the pad sensor and receives a detection value thereof and determines any abnormality by comparing the detection value with a previously inputted reference setting value and outputs a result thereof in the form of a control signal, wherein the controller guides in real time, to the vehicle driver, at least two or more than two information among a processing result value, a pedal effort sensor detection value, a vacuum sensor detection value, a pressure sensor detection value, and a pad sensor detection value and is connected to a display unit which is formed of any or both of a display which displays information on a screen and a speaker which outputs the information in the form of sound, and wherein the controller includes a connector which is a connection component which supplies, to an external measurement device, at least two or more of the processing result value, the pedal effort sensor detection value, the vacuum sensor detection value, the pressure sensor detection value, and the pad sensor detection value, and an engine start controller which controls that the engine of the vehicle is not started selectively based on the pedal effort sensor detection value, the vacuum sensor detection value, the pressure sensor detection value, and the pad sensor detection value.

2. The device of claim 1, wherein the controller includes one or more of an input unit that receives a detection value from each of the pedal effort sensor, the vacuum sensor, the pressure sensor and the pad sensor; a calculation unit that compares the detection value inputted via the input unit with a previously inputted reference setting value and process the values; an output unit that outputs the information processed by the calculation unit; and a memory unit which is connected to the input unit, the calculation unit and the output unit receive information from each of them and store the received information.

\* \* \* \* \*